US011892781B2

(12) United States Patent
Lim et al.

(10) Patent No.: US 11,892,781 B2
(45) Date of Patent: Feb. 6, 2024

(54) METHOD FOR ERROR HANDLING IN THE TONER REFILL PROCESS

(71) Applicant: Hewlett-Packard Development Company, L.P., Spring, TX (US)

(72) Inventors: Mok-Hwa Lim, Seongnam-si (KR); Hyeonseung Lee, Seongnam-si (KR); Jang-Geun Kim, Seongnam-si (KR); Jincheol Kim, Seongnam-si (KR); ByeongNo Jeong, Seongnam-si (KR); Sungchul Ahn, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 17/532,101

(22) Filed: Nov. 22, 2021

(65) Prior Publication Data

US 2022/0075307 A1 Mar. 10, 2022

Related U.S. Application Data

(63) Continuation of application No. 17/051,267, filed as application No. PCT/US2019/031331 on May 8, 2019, now Pat. No. 11,209,762.

(30) Foreign Application Priority Data

Nov. 6, 2018 (KR) ........................ 10-2018-0135024

(51) Int. Cl.
*G03G 15/08* (2006.01)
*G03G 15/00* (2006.01)
*G03G 21/18* (2006.01)

(52) U.S. Cl.
CPC ..... *G03G 15/0863* (2013.01); *G03G 15/0879* (2013.01); *G03G 15/0894* (2013.01);
(Continued)

(58) Field of Classification Search
CPC ........... G03G 15/0863; G03G 15/0879; G03G 15/0894; G03G 15/5066; G03G 15/55;
(Continued)

(56) References Cited

U.S. PATENT DOCUMENTS 8,376,511 B2 2/2013 Shimoda et al.
2002/0025173 A1 2/2002 Isobe et al.
(Continued)

FOREIGN PATENT DOCUMENTS

CN 1786843 A 6/2006
JP 2000-284581 A 10/2000
(Continued)

*Primary Examiner* — Benjamin R Schmitt
(74) *Attorney, Agent, or Firm* — Foley & Lardner LLP

(57) ABSTRACT

A toner cartridge includes a customer replaceable unit monitoring (CRUM) apparatus to store error information of a toner injection process of the toner cartridge using a toner refill apparatus. Based on the error information not being stored in the CRUM apparatus, an availability of a refill operation of the toner cartridge is identified based on a predetermined first reference value and an amount of toner detected in the toner cartridge, and, based on the error information being stored in the CRUM apparatus, the availability of the refill operation of the toner cartridge is identified based on a predetermined second reference value and the amount of toner detected in the toner cartridge.

15 Claims, 9 Drawing Sheets

(52) U.S. Cl.
CPC ......... *G03G 15/5066* (2013.01); *G03G 15/55* (2013.01); *G03G 21/1878* (2013.01); *G03G 15/0867* (2013.01); *G03G 2215/0697* (2013.01); *G03G 2221/1823* (2013.01)

(58) Field of Classification Search
CPC ........... G03G 21/1878; G03G 15/0867; G03G 2215/0697; G03G 2221/1823
See application file for complete search history.

(56) References Cited

U.S. PATENT DOCUMENTS

| | | | |
|---|---|---|---|
| 2003/0180059 | A1 | 9/2003 | Iida et al. |
| 2004/0040614 | A1 | 3/2004 | Sesek et al. |
| 2005/0041998 | A1 | 2/2005 | Fujii et al. |
| 2005/0078969 | A1 | 4/2005 | Kikuchi |
| 2005/0157117 | A1 | 7/2005 | Silverbrook |
| 2005/0157123 | A1 | 7/2005 | Silverbrook |
| 2006/0109320 | A1 | 5/2006 | Cutler et al. |
| 2006/0114491 | A1 | 6/2006 | Kim et al. |
| 2006/0127105 | A1 | 6/2006 | Lee |
| 2009/0153602 | A1 | 6/2009 | Brown et al. |
| 2012/0206519 | A1 | 8/2012 | Aono et al. |
| 2013/0028617 | A1 | 1/2013 | Fukuoka et al. |
| 2014/0063147 | A1 | 3/2014 | Iwamuro et al. |
| 2017/0008295 | A1 | 1/2017 | Osakabe et al. |

FOREIGN PATENT DOCUMENTS

| | | | |
|---|---|---|---|
| JP | 2005-181855 | A | 7/2005 |
| JP | 2016-114921 | A | 6/2016 |
| WO | WO-2007/024930 | A2 | 3/2007 |

FIG. 5

| TONER REFILL APPARATUS | | |
|---|---|---|
| ID | Item | Value |
| 1 | Docking Count | Number |
| 2 | Used Bit | 0 or 1 |

FIG. 6

| TONER CARTRIDGE | | |
|---|---|---|
| ID | Item | Value |
| 1 | Emergency Recharge Cartridge Serial No | Text |

FIG. 7

| IMAGE FORMING APPARATUS | |
|---|---|
| Item | Value |
| Emergency Recharge Cartridge Serial No | Text |

FIG. 8

| TONER CARTRIDGE | |
|---|---|
| Item | Value |
| Emergency Flag | 0 or 1 |

METHOD FOR ERROR HANDLING IN THE TONER REFILL PROCESS

BACKGROUND

An image forming apparatus generally operates to print out print data generated at a terminal such as a computer onto a printing paper. Examples of an image forming apparatus may include a copier, a printer, a scanner, a facsimile, or a multi-function peripheral (MFP) in which the above functions are combined and implemented by one apparatus.

An image forming apparatus in a laser printing method uses toner to print an image. Toner is used every time an image forming operation is made and exhausted when used for a predetermined period of time or more.

BRIEF DESCRIPTION OF THE DRAWINGS

Certain examples of the present disclosure will be more apparent from the following description taken in conjunction with the accompanying drawings, in which:

FIG. 5 is a diagram illustrating an example of information stored in a memory chip of a toner refill apparatus;

FIG. 6 is a diagram illustrating an example of information stored in a customer replaceable unit monitoring (CRUM) apparatus of a toner cartridge, in a case that an error has occurred and information of a toner refill apparatus is stored in the toner cartridge;

FIGS. 7 and 8 are diagrams illustrating examples of information stored in a toner cartridge and a memory of an image forming apparatus, in a case that an error has occurred and information of a toner refill apparatus is stored in the memory.

Throughout the drawings, it should be noted that like reference numerals are used to represent the same or similar elements, features, parts, components, or structures.

DETAILED DESCRIPTION

One or more examples will be described below with reference to the accompanying drawings. The examples described below may be modified and implemented in various different forms. In order to more clearly describe the features of the examples, a detailed description of known matters to those skilled in the art will be omitted.

In the present disclosure, a case in which any one feature is connected with another feature includes a case in which the features are directly connected with each other and a case in which the features are indirectly (e.g., electrically) connected with each other with other features interposed therebetween. Further, when a feature is stated as "comprising" another feature, unless otherwise stated, this means that the feature may include yet another feature, rather than foreclosing the same.

The term "image forming job" as used herein may mean various jobs related to an image (e.g., copying, printing, scanning, or faxing), such as forming an image or creating/storing/transmitting an image file. In addition, the term "job" may mean not only an image forming operation but also a series of processes necessary for performing an image forming operation.

An image forming apparatus generally operates to print out print data generated at a terminal such as a computer onto a printing medium such as printing paper. An example of an image forming apparatus includes a copier, a printer, a facsimile and a multi-function peripheral (MFP) that provides combined functionality of at least two of the single apparatuses. The image forming apparatus may refer to any apparatus capable of performing an image forming operation, such as a copier, a printer, a scanner, a fax machine, an MFP, a display apparatus, or the like.

The term "print data" may refer to data that is converted into a format printable in a printer. If a printer supports direct printing, the file itself may be print data.

The term "user" may refer to a person who performs an operation related to an image forming operation using an image forming apparatus or an apparatus connected to the image forming apparatus via wire or wirelessly. In addition, the term "manager" may refer to a person who has the authority to access all functions and the system of the image forming apparatus. The terms "manager" and the "user" may refer to the same person.

Figure 1:
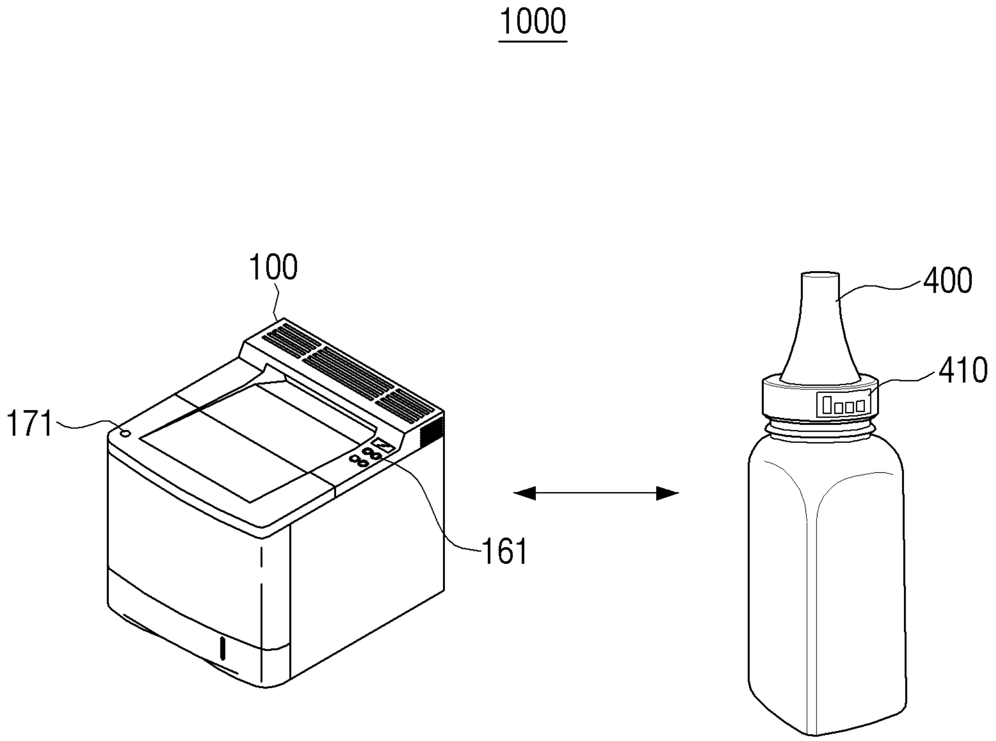
FIG. 1 is a diagram illustrating a configuration of an image forming system, according to an example.

FIG. 1 is a diagram illustrating a configuration of an image forming system, according to an example.

Referring to FIG. 1, an image forming system 1000 may include an image forming apparatus 100 and a toner refill apparatus 400.

The image forming apparatus 100 may carry out a print job by using toner stored in a toner cartridge.

The image forming apparatus 100 may, when the toner refill apparatus 400 is connected, identify whether it is possible to refill the toner cartridge and whether the toner refill apparatus 400 is available.

In a case that the toner refill operation can be performed, the image forming apparatus 100 may refill toner in the toner cartridge by using the toner refill apparatus 400. To this end, the image forming apparatus 100 may include a sealing cover 171 for connection to the toner refill apparatus 400. At a lower part of the sealing cover 171, a tube connecting the sealing cover 171 to the toner cartridge (e.g., a toner storage container of the toner cartridge) may be disposed. For example, toner from the toner refill apparatus 400 may be supplied to the toner cartridge via the tube.

A door member (not illustrated) for electrically opening and closing an opening (e.g., a hole) or a tube may be disposed relative to a particular location of the opening or the tube. The door member (not illustrated) is an apparatus which opens and closes an opening according to an electrical signal, and may be driven by an apparatus such as a solenoid and the like.

The image forming apparatus 100 may identify whether an error has occurred during a toner injection process by means of the toner refill apparatus 400. If an error has occurred, the image forming apparatus 100 may store information relating to the error in the toner cartridge. Examples of a constitution and operation of the image forming apparatus 100 will be described below by referring to FIGS. 2 and 3.

The image forming apparatus 100 may include a button 161, and receive an input of a user control command through the button 161. The button 161 may be a power button, a cancel button, a print button, etc. The button 161 may be used for the purpose of receiving input of the fact that an error has occurred in the toner refill apparatus 400.

The toner refill apparatus 400 is an apparatus which provides toner to the image forming apparatus 100. The toner refill apparatus 400 may have the shape of a bottle capable of containing toner, and have an outlet capable of injecting toner contained in the bottle into an opening (e.g., a hole) of the toner cartridge. The outlet may be inserted into the sealing cover 171 described above, in a case that the toner refill apparatus 400 is connected to the image forming apparatus 100.

In various examples, the toner refill apparatus 400 may be implemented in a syringe form. The toner refill apparatus 400 may be referred to as a refill bottle, a toner syringe, etc.

The toner refill apparatus 400 may include a memory chip 410 which stores information of the toner refill apparatus 400. The memory chip 410 may be referred to as a refill bottle memory, a refill bottle chip, a refill sealing memory, a refill sealing chip, etc.

The memory chip 410 may be disposed on one side of the toner refill apparatus 400. For example, when an inlet of the toner refill apparatus 400 is inserted into the sealing cover 171 of the image forming apparatus 100, the memory chip 410 may be disposed at a location in which it is possible to communicate with a wired terminal of the image forming apparatus 100 or a wireless communication apparatus (e.g., using near-field communication (NFC)).

The memory chip 410 may store information of the toner refill apparatus 400. For example, the memory chip 410 may store information relating to identifying information, manufacturer, manufacturing date, information of a toner, and the like of the toner refill apparatus 400.

The memory chip 410 may store history information related to toner refill. For example, the memory chip 410 may store refill start information, refill ending time, refill time information, cartridge information of the image forming apparatus 100, error information, etc. Herein, the error information may be information (e.g., a 1-bit flag) indicating whether an error has occurred in the refill process, or may be the number of dockings. Herein, the number of dockings may include information indicating how many times the toner refill apparatus 400 has been connected to the image forming apparatus 100 (or toner cartridge), which may, for example, store a value of 0 when the connection has never been made before, store a value of 1 when the connection has been made once and a refill is completed, and store a value of 1 or more when an error has occurred in the toner refill process.

Accordingly, if the number of dockings is a value greater than 2, or is a value of 1 but the refill ending information does not have completion information, it may be understood that an error has previously occurred. In various examples, only a counter value in which an error has occurred may be stored.

Information stored in the memory chip 410 may be encrypted and stored. In an example, the memory chip 410 may be a non-volatile memory such as electrically erasable programmable read-only memory (EEPROM) and the like.

As described above, the image forming system 1000 according to an example may refill toner in the image forming apparatus 100 by using the toner refill apparatus 400. In addition, in a case that an error has occurred in the refill process, the image forming system 1000 may recognize the occurrence of the error, and thus it is possible to appropriately respond to the error occurrence.

Figure 2:
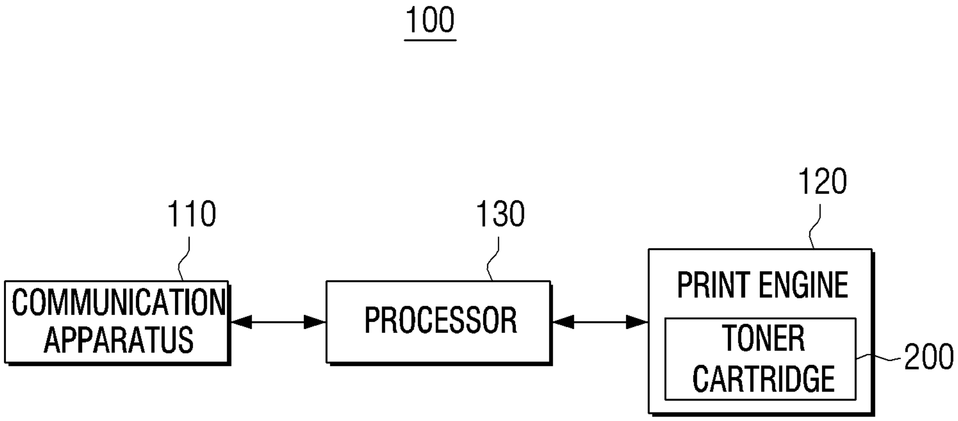
FIG. 2 is a block diagram illustrating a brief example of the image forming apparatus of FIG. 1.

FIG. 2 is a block diagram illustrating a brief example of the image forming apparatus of FIG. 1.

Referring to FIG. 2, the image forming apparatus 100 may include a communication apparatus 110, a print engine 120, and a processor 130. The print engine 120 may include a toner cartridge 200.

The communication apparatus 110 may be connected to a print control terminal apparatus (not illustrated) and may receive print data from the print control terminal apparatus. The print control terminal apparatus may be an electronic apparatus which provides print data, and may be, for example, a personal computer (PC), a notebook PC, a tablet PC, a smartphone, a server, and the like.

The communication apparatus 110 may be formed to connect to an external apparatus, such as a management server (not illustrated), and may be connected via not only a local area network (LAN) or the Internet but also a universal serial bus (USB) port or a wireless communication (e.g., Wi-Fi 802.11a/b/g/n, near field communication (NFC), or Bluetooth) port. The communication apparatus 110 may be referred to as a 'transceiver'.

The communication apparatus 110 may communicate with the memory chip 410 attached to the toner refill apparatus 400 of FIG. 1. For example, the communication apparatus 110 may, when the toner refill apparatus 400 is connected to the sealing cover 171 of FIG. 1, communicate with the memory chip 410 of the toner refill apparatus 400.

The communication apparatus 110 may be electrically connected to the toner refill apparatus 400 through a plurality of terminals mounted on a main body of the image forming apparatus 100 or communicate with the memory chip 410 of the toner refill apparatus 400 using a radio frequency identification (RFID) method.

When an amount of toner in the toner cartridge 200 is less than or equal to a predetermined amount and it is determined necessary to replace the toner cartridge 200 or refill the toner cartridge 200, the communication apparatus 110 may notify the management server (not illustrated) or a manager (e.g., a terminal apparatus of a manager) of the information.

The print engine 120 may form an image. The print engine 120 may form an image on an image forming medium, such as a photosensitive drum, an intermediate transfer belt, a sheet conveyance belt, or the like.

The print engine 120 may include various consumable devices directly or indirectly involved in an image forming job. For example, in the case of a laser image forming apparatus, electrification devices, light exposure devices, developing devices, transcription devices, settling devices, various rollers, belts, organic photo conductor (OPC) drums, etc. may be consumable devices. Besides these, various types of devices that must be replaced after being used in an image forming apparatus, such as a developer, may be defined as consumable devices. An example of a consumable device is a toner cartridge, which may carry out a function of the developer as described above. An example of a configuration and an operation of the print engine 120 will be described later with reference to FIG. 4.

The processor 130 may control each unit within the image forming apparatus 100. For example, the processor 130 may control the print engine 120 to perform a print job regarding received print data when the print data is received from a print control terminal apparatus (not illustrated).

The processor 130 may be implemented as one apparatus, such as a central processing unit (CPU), and may be also implemented as a plurality of apparatuses, such as a clock generating circuit, a CPU, a graphic processor, and the like.

The processor 130 may identify whether the toner refill apparatus 400 is connected to the image forming apparatus 100. For example, when an electrical connection or an NFC communicative connection with the memory chip 410 of the toner refill apparatus 400 is identified, the processor 130 may identify that the toner refill apparatus 400 is connected.

When the toner refill apparatus 400 is connected, the processor 130 may identify whether the toner refill apparatus 400 is available and whether it is possible to refill the toner cartridge 200.

An example operation of identifying whether it is possible to refill the toner cartridge 200 will be described below.

A toner refill is possible only when the toner cartridge 200 includes sufficient free space to receive a toner injection. In general, in a toner refill, it is expected that all toner in the toner refill apparatus 400 is injected into the toner cartridge 200, and thus it is necessary that the toner cartridge 200 has an empty space which is larger than the amount of toner included in the toner refill apparatus 400.

Accordingly, the processor 130 may, if the amount of toner in the toner cartridge 200 is larger than or equal to a predetermined first toner amount, identify that a refill of the toner cartridge 200 is not available, and if the amount of toner in the toner cartridge 200 is less than (or equal to) the predetermined first toner amount, identify that the refill of the toner cartridge 200 is available.

It may be difficult to calculate an accurate toner amount in the toner cartridge 200. Thus, in a case that an error has occurred, a toner amount of the toner cartridge 200 identified by the processor 130 and a toner amount of the actual toner cartridge 200 may be different from each other. That is, a toner amount of the toner cartridge 200 identified by the processor 130 may indicate that a toner refill is possible, but actually, the toner cartridge 200 may include more toner than what is identified by the processor 130.

Accordingly, the processor 130 may, in a case that an error has occurred in the toner refill process, identify whether it is possible to refill the toner cartridge 200 based on a second toner amount that is less than the predetermined first toner amount described above.

That is, the processor 130 may, when error information of the toner cartridge 200 is not stored, identify whether a refill is possible based on a first reference value (e.g., 60%), and when the error information of the toner cartridge 200 is stored, identify whether a refill is possible based on a second reference value (e.g., 20%) less than the first reference value. Thereby, it is possible to prevent an overflow of toner that may occur when a refill operation is performed again by means of a new toner refill apparatus after an error occurs.

However, in a case that a toner refill apparatus used at the time when the error occurred is connected again, an operation of identifying whether a refill of the toner cartridge 200 described above is possible may be omitted. That is, in a case that the corresponding toner refill apparatus 400 is connected again, it has already been identified that there would be no problem of toner overflow even if the entire amount of toner in the toner refill apparatus 400 is injected into the toner cartridge 200.

An example operation of identifying the availability of a toner refill apparatus will be described below.

The processor 130 may identify whether the toner refill apparatus 400 is available based on information stored in the memory chip 410 of the toner refill apparatus 400. As an example, the processor 130 may read information stored in the memory chip 410, and carry out an authentication procedure to identify whether the connected toner refill apparatus 400 is an authorized apparatus based on the information stored in the memory chip 410.

This authentication procedure may be the same as or similar to an authentication method for the CRUM apparatus 300, which will be described later with reference to FIG. 3. Alternatively, the authentication for the toner refill apparatus 400 may use a different method than the authentication method for the CRUM apparatus 300. For example, the authentication procedure for the toner refill apparatus 400 may vary as compared with the authentication method for the CRUM apparatus 300 by using an encryption algorithm of which a security level is relatively low or by using a relatively simple authentication procedure. For example, the processor 130 may carry out an authentication procedure to decode a digital signature stored in the memory chip 410 of the toner refill apparatus 400.

If the toner refill apparatus 400 is an authenticated apparatus, the processor 130 may identify whether the toner refill apparatus 400 is available. For example, the processor 130 may, based on information stored in the toner refill apparatus 400 currently connected, identify that a toner refill can be performed. In one example, the processor 130 may determine whether information relating to another image forming apparatus is stored in the memory chip 410. If the processor 130 determines that information relating to another image forming apparatus is not stored in the memory chip 410, the processor 130 may identify that the toner refill can be performed.

Here, the information relating to the image forming apparatus 100 may be usage history information indicating whether the toner refill apparatus 400 has ever been connected to the image forming apparatus 100. In an example, the usage history information may be identifying information (e.g., serial number information of the image forming apparatus 100 or serial number information of the toner cartridge). In other examples, intrinsic information relating to the image forming apparatus 100 such as media access control (MAC) information and the like, as well as the identifying information may be used, or intrinsic information to specify the toner cartridge may be used.

Accordingly, if the usage history information is not stored in the memory chip 410, the processor 130 may identify that the corresponding toner refill apparatus 400 has no usage history, and that the toner refill apparatus 400 is available.

When an error has occurred in a toner refill process, for example, in a case in which a power of the image forming apparatus 100 is turned off during the refill process, only some toner is refilled by mistake of a user, or a temporary abnormality has occurred at an inlet or a pipe, a method for reusing the toner refill apparatus 400 may be needed.

Accordingly, even if information relating to the image forming apparatus 100 is stored, in a case that the stored information matches with the information of the image forming apparatus 100, that is, in a case that identifying information stored in the memory chip 410 matches with a serial code of the image forming apparatus 100, the processor 130 may identify that the corresponding toner refill apparatus 400 is available.

For this operation, the processor 130 may, when information relating to another image forming apparatus is not stored in the memory chip 410 (e.g., the toner refill apparatus 400 is connected for the first time), store identification information of the image forming apparatus 100 (e.g., a serial number of the image forming apparatus 100, a serial number of the toner cartridge, etc.) in the memory chip 410.

In an example, the toner refill apparatus 400 may be connected and used for only a predetermined number of times. Accordingly, the processor 130 may identify that the corresponding toner refill apparatus 400 is available only if the number of dockings stored in the toner refill apparatus 400 is less than or equal to a predetermined value.

To this end, the processor 130 may update the number of dockings (or error counter value) of the toner refill apparatus 400.

When it is identified that the toner refill apparatus 400 is available, the processor 130 may control a door member to open a hole to provide access to the toner cartridge 200.

When a predetermined event occurs in the toner refill process, the processor 130 may identify that an error has occurred during toner injection. For example, if a toner injection to the toner cartridge 200 has not been completed within a predetermined time, the processor 130 may identify that an error has occurred. That is, when a toner injection completion event does not occur for a predetermined time, the processor 130 may identify that an error has occurred.

When a button informing that a toner error has occurred in the toner injection process is selected, the processor 130 may identify that the error has occurred. In an example, the button may be located near the sealing cover 171 and be exclusively for receiving an input of an occurrence of a toner error. In another example, the button may be a multifunction button that may receive an input of an occurrence of a toner error as well as receive inputs for performing one or more different function.

In an example, the processor 130 may activate a button provided on a main body of the image forming apparatus 100 in the toner refill process for, instead of an intrinsic function, a function to receive input of an error. Accordingly, the user may notify the processor 130 of an error by an operation of selecting a button provided on the main body in the toner refill process. The button described above may be a power button, a cancel button, a print button, etc.

When an error occurs during the toner refill process, the processor 130 may store information about the error in the toner cartridge 200. For example, the processor 130 may store information of the toner refill apparatus 400 in the toner cartridge 200. For example, the processor 130 may store identifying information of the toner refill apparatus 400 in the toner cartridge 200. Alternatively, the processor 130 may set, in the toner cartridge 200, only flag information indicating that an error has previously occurred, and store the identifying information of the toner cartridge 200 in an additional storage.

When the toner refill is completed, the processor 130 may store information relating to the completion of toner refill in the memory chip 410.

Although the image forming apparatus 100 has been illustrated and described above considering only basic elements, it is understood that various configurations may be additionally provided during implementation. Examples of such configurations will be described below with reference to FIG. 3.

Figure 3:
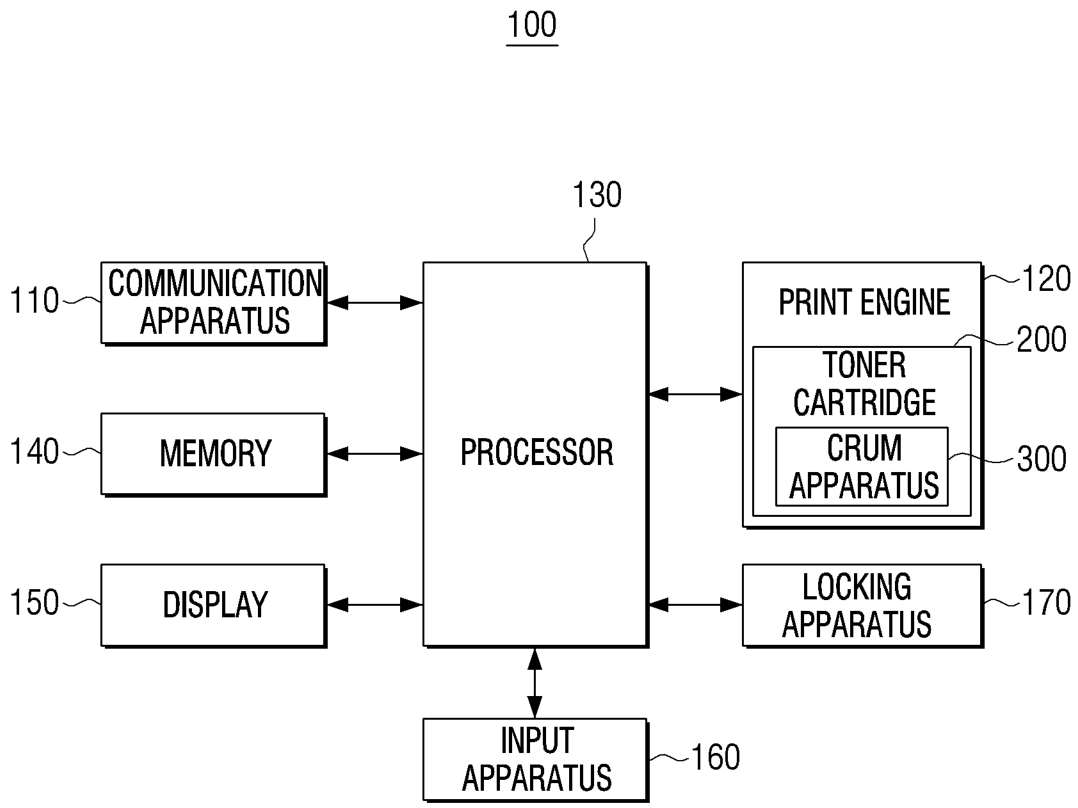
FIG. 3 is a block diagram illustrating a more detailed example of an image forming apparatus of FIG. 1.

FIG. 3 is a block diagram illustrating a more detailed example of an image forming apparatus of FIG. 1.

Referring to FIG. 3, the image forming apparatus 100 may include a communication apparatus 110, a print engine 120, a processor 130, a memory 140, a display 150, an input apparatus 160, and a locking apparatus 170.

The communication apparatus 110 is explained in FIG. 2, and thus will not be further explained below for the sake of brevity. In addition, the processor 130 and the print engine 120 are explained in FIG. 2, and thus will not be further explained below for the sake of brevity. Only added elements in FIG. 3 will be explained below.

The processor 130 may communicate with the CRUM apparatus 300. As an example, the processor 130 may perform communication for authentication of the CRUM apparatus 300 and for management of data stored in the CRUM apparatus 300.

In this case, the processor 130 may communicate with the CRUM apparatus 300 in an Inter-Integrated Circuit (I2C) method or in an enhanced Inter-Integrated Circuit (eI2C) method. The I2C method may be a standardized serial communication method which uses a data (SDA) signal and a clock signal. The eI2C method changes the I2C method so that the clock signal has periodicity in the idle period as well. The eI2C method may be referred to by various names, such as a 3 contact point I2C method, an encoding I2C method, and the like.

The CRUM apparatus 300 may be an apparatus that stores information of a consumable apparatus (e.g., the toner cartridge 200) and the like, and may be referred to as a memory, a memory chip, a chip apparatus, a toner cartridge memory, and the like.

The processor 130 may communicate with the memory chip 410 of the toner refill apparatus 400. In a case in which the toner cartridge 200 includes terminals for connection with the toner refill apparatus 400, the processor 130 may communicate with the memory chip 410 of the toner refill apparatus 400 by using the I2C method or eI2C method in the same manner as the CRUM apparatus 300 described above.

The processor 130 may perform encryption for data transferred to the CRUM apparatus 300 or a memory chip 410 of the toner refill apparatus 400 and perform communication. For the encryption algorithm, various encoding algorithms such as RSA, ECC asymmetric algorithm, ARIA, TDES, SEED, AES symmetric key algorithm, etc. may be used.

In a case in which the processor 130 communicates with a memory chip 410 of the connected CRUM apparatus 300 or the connected toner refill apparatus 400 by using the I2C method or the eI2C method, to perform communication with the CRUM apparatus 300 or the memory chip 410, the processor 130 may generate a clock signal, generate and transmit a data signal, or receive a data signal.

The processor 130 may perform an authentication procedure to identify whether the mounted CRUM apparatus is an authorized apparatus based on information provided from the CRUM apparatus 300. In addition, the processor 130 may identify whether it is necessary to perform a toner refill based on the information provided from the CRUM apparatus 300 (e.g., information relating to a residual amount of consumables).

If a toner refill is necessary, the processor 130 may control the display 150 to display a message indicating the necessity of toner refill.

The cartridge information of the image forming apparatus 100 described above may be stored in the CRUM apparatus 300 attached to the toner cartridge 200 or may be stored in the memory 140 of the image forming apparatus 100. If the cartridge information is stored in the CRUM apparatus 300, the processor 130 may read cartridge information stored in the CRUM apparatus 300.

The processor 130 may store information of the toner refill apparatus 400 in the CRUM apparatus 300. The information stored in the CRUM apparatus 300 may be intrinsic information of the toner refill apparatus 400 (e.g., a serial number of the toner refill apparatus 400).

As described above, the processor 130 may store information of the toner refill apparatus 400 (e.g., identifying information of the toner refill apparatus) in the CRUM apparatus 300. Accordingly, it is possible to identify whether the toner refill apparatus 400 is available by using the information of the toner refill apparatus stored in the CRUM apparatus 300.

As an example, in a case in which identifying information of the toner refill apparatus 400 is stored in the CRUM apparatus 300, the processor 130 may compare the identifying information of the toner refill apparatus 400 stored in the CRUM apparatus 300 with the information of the toner refill apparatus 400 (e.g., a serial number of the toner refill apparatus) with each other and identify whether the toner refill apparatus 400 is available.

When it is identified that the toner refill apparatus 400 is available, the locking apparatus 170 may be controlled to fix the toner refill apparatus 400 and the image forming apparatus 100 in the toner refill process. In an example, the locking apparatus 170 is an apparatus to fix the toner refill apparatus 400 to the image forming apparatus 100, which may be driven by an apparatus such as solenoid and the like.

When it is identified that the toner refill apparatus 400 is not available, the processor 130 may control the display 150 to display a message indicating that the toner refill apparatus 400 is not available. The message may include not only the difficulty of using the toner refill apparatus 400, but also a reason thereof. For example, the message may include information relating to whether an unauthentic toner refill apparatus 400 is connected, whether it is a product for which toner refill has been performed already, whether toner refill has not been completed but a use period has been expired, whether the number of connections has been exceeded, or the like.

When the toner refill is processed, the processor 130 may continuously identify whether the toner refill is completed. As an example, when a toner amount detected in the toner cartridge 200 is changed to more than a predetermined value, the processor 130 may identify that the toner injection is completed. A sensor (not illustrated) for sensing a toner amount in the toner cartridge 200 may be provided.

When a toner refill is completed, the processor 130 may control the locking apparatus 170 such that the toner refill apparatus 400 and the image forming apparatus 100 are detached from each other. The processor 130 may also control the display 150 to display a message requesting detachment of the toner refill apparatus 400.

If an error has occurred in the toner refill process, the processor 130 may store a flag informing of the fact that the error has occurred in the memory 140 or in the toner cartridge 200. Accordingly, the processor 130 may identify that the error has occurred during toner refill by means of a flag stored during the initial booting of the image forming apparatus 100. In addition, when information relating to the error (e.g., the flag) is stored in the toner cartridge 200, the processor 130 may control the locking apparatus 170 such that the toner refill apparatus 400 and the image forming apparatus 100 are detached from each other.

When the toner refill is completed, the processor 130 may newly update a toner amount of the toner cartridge 200. As an example, the processor 130 may change a toner amount newly sensed using a sensor provided in the toner cartridge 200 to a toner amount of the toner cartridge 200.

The processor 130 may store the newly-changed toner amount in the CRUM apparatus 300 of the toner cartridge 200. In addition, the processor 130 may store information of the connected toner refill apparatus 400 in the CRUM apparatus 300 and may store information, such as the number of toner refills and the like, in the CRUM apparatus 300.

The memory 140 may store print data which is received through the communication apparatus 110. The memory 140 may store history information of a print job that is performed in the image forming apparatus 100.

The memory 140 may store information relating to a toner refill history for the toner cartridge 200. When the toner refill is in progress, the memory 140 may store information indicating that the refill is in progress. This information may be deleted once the toner refill is completed.

When the error has occurred in the refill process, the memory 140 may store information (e.g., identifying information) that relates to the toner refill apparatus 400 in which the error has occurred.

The memory 140 may be implemented by a storage medium in the image forming apparatus 100 or an external storage medium, for example, a removable disk including a USB memory or a web server through a network.

In an implementation, the memory 140 may include a plurality of memory elements. For example, the memory 140 may include a first memory which stores data required for performing operations of an image forming apparatus and a second memory which stores information relating to the CRUM apparatus 300 or the toner refill apparatus 400. The second memory may be a non-volatile memory such as the memory chip 410 (e.g., an electrically erasable programmable read-only memory (EEPROM)).

The display 150 may display various information provided from the image forming apparatus 100. As an example, the display 150 may display a user interface window to select various functions provided by the image forming apparatus 100.

The display 150 may display a control menu for performing a function of the image forming apparatus 100.

The display 150 may display information relating to consumables. For example, when it is identified that replacement of consumables is necessary, the display 150 may display replacement information and display an expected time of replacement. In addition, when a toner of the toner cartridge 200 from among the consumables becomes less than or equal to a preset amount, the display 150 may display that a toner refill is necessary.

The display 150 may, in the toner refill process, display a message indicating that the fact that an error has occurred may be input through a button provided on the main body of the image forming apparatus 100.

The display 150 may display manual information regarding how to use the toner refill apparatus 400. When it is identified that the connected toner refill apparatus 400 is not available, the display 150 may display a message indicating that the refill cannot be performed.

The input apparatus 160 may receive an input of a user's function selection and a control command for the corresponding function. The function may include printing, copying, scanning, fax transmission, and the like. Such function control command may be received through a control menu displayed in the display 150.

The input apparatus 160 may include a button provided on the main body of the image forming apparatus 100. The button described above may be a power button, a cancel button, a print button, etc. The button may receive the control command described above and may receive the fact that the error has occurred in the refill process. For example, the power button may typically perform a function of receiving input of a command to convert a power of the image forming apparatus 100 and may perform a function of receiving input of the fact that the error has occurred in the toner refill process.

The print engine 120 may form an image. For example, the print engine 120 may perform a print job by means of a toner filling the toner cartridge 200.

The toner cartridge 200 is an apparatus providing toner to a developer, and the toner may be refilled by the toner refill apparatus 400. In addition, the CRUM apparatus 300 storing information relating to the toner cartridge 200 may be mounted on the toner cartridge 200. The CRUM apparatus 300 may be attached to the toner cartridge 200 or may be additionally mounted on the image forming apparatus 100.

The toner cartridge 200 may receive toner from the toner refill apparatus 400 via a pipe or similar mechanism connecting the sealing cover 171 and the toner cartridge 200, and receive a toner refill.

As described above, the image forming apparatus 100 may refill toner and use the toner without replacing the toner cartridge 200. In addition, even in a case that the error has occurred in the refill process, it is possible to reuse the toner refill apparatus 400 for a predetermined number of times.

In FIGS. 2 and 3, it is illustrated and described that the image forming apparatus 100 includes one toner cartridge 200. However, this is merely an example. In implementation, the image forming apparatus 100 may include a plurality of toner cartridges 200. Correspondingly, a plurality of CRUM apparatuses 300 may be mounted on the image forming apparatus 100.

In FIGS. 2 and 3, it is described that the processor 130 directly communicates with the CRUM apparatus 300 and the toner refill apparatus 400. However, in an implementation, the processor 130 may communicate with the CRUM apparatus 300 and the memory chip 410 of the toner refill apparatus 400 via the communication apparatus 110.

Figure 4:
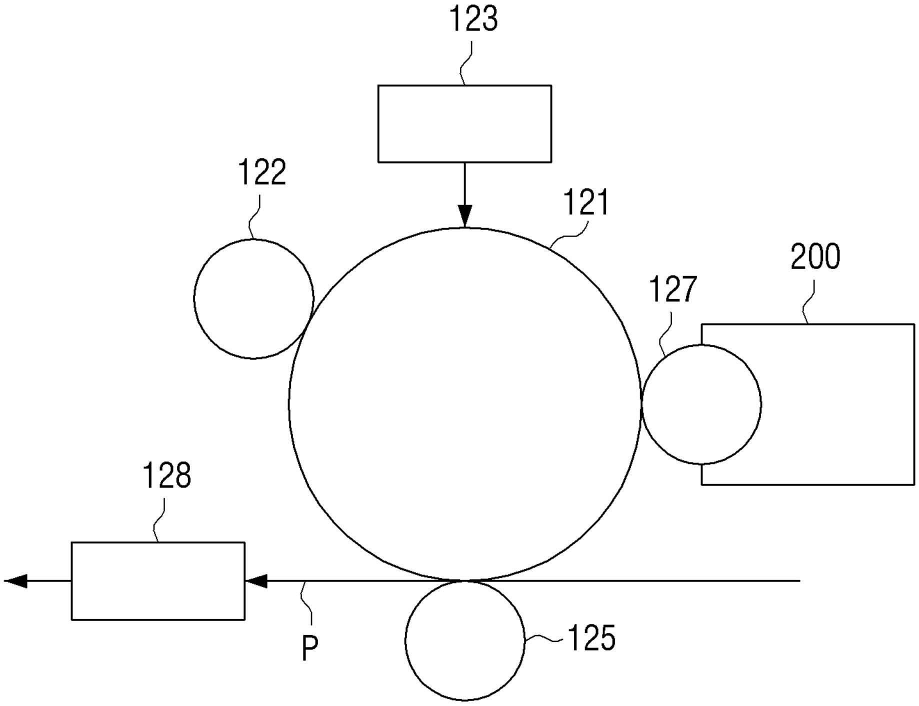
FIG. 4 is a diagram illustrating an example of a print engine of FIG. 2.

FIG. 4 is a diagram illustrating an example of a print engine of FIG. 2.

Referring to FIG. 4, the print engine may include a photosensitive drum 121, a charger 122, an exposure apparatus 123, a developer 200, a transferring apparatus 125, and a fixing apparatus 128.

An electrostatic latent image is formed in the photosensitive drum 121. The photosensitive drum 121 may be referred to as a photosensitive drum, a photosensitive belt, and the like, according to forms.

The charger 122 charges the surface of the photosensitive drum 121 to a uniform potential. The charger 122 may be implemented as a corona charger, a charging roller, a charging brush, and the like.

The exposure apparatus 123 may change the surface potential of the photosensitive drum 121 based on information of an image to be printed to form an electrostatic latent image on the surface of the photosensitive drum 121.

The developer 200 may accommodate a developing agent therein and develop the electrostatic latent image into a visible image through supply of the developing agent onto the electrostatic latent image. The developer 200 may include a developing roller 127 for supplying the developing agent (e.g., toner) to the electrostatic latent image. The developer 200 may be referred to as a toner cartridge.

The visible image formed on the photosensitive drum 121 may be irradiated to a recording medium (P) by the transferring apparatus 125 or an intermediate transfer belt (not illustrated).

The fixing apparatus 128 may fix a visible image on the recording medium P by applying heat and/or pressure to a visible image on the recording medium P. The printing operation may be completed by this series of processes.

The developing agent described above may be used every time an image forming operation is made and exhausted when used for a predetermined number of times or more. In an example in which the developing agent is toner, it is possible to refill the toner by means of the toner refill apparatus, without replacement of the developer 200.

FIG. 5 is a diagram illustrating an example of information stored in a memory chip of a toner refill apparatus.

Referring to FIG. 5, the memory chip (e.g., memory chip 410) may include the number of dockings and completion information.

In this case, the number of dockings is information stored in the image forming apparatus 100 regarding the number of times the toner refill apparatus 400 is connected to the image forming apparatus 100 (or toner cartridge 200), which may indicate whether the toner refill apparatus 400 has been connected to the image forming apparatus 100.

The completion information may be information indicating that a toner injection using the toner refill apparatus 400 has been completed, which may be a 1-bit code.

In the example above, it is illustrated and described that two pieces of information are stored in the memory chip 410. However, in an implementation, various information other than the information described above may be further stored in the memory chip 410. For example, the memory chip 410 may further store a type of toner included in the toner refill apparatus 400 (e.g., color information), manufacturer information, expiration date information, authenticity identification code, refill time information, intrinsic information of the toner refill apparatus 400, intrinsic information of the image forming apparatus 100 or the toner cartridge 200 that have ever been connected, etc. In addition, in an implementation, some of the information described above may be omitted.

FIG. 6 is a diagram illustrating an example of information stored in a customer replaceable unit monitoring (CRUM) apparatus of a toner cartridge, in a case that an error has occurred and information of a toner refill apparatus is stored in the toner cartridge.

Referring to FIG. 6, the toner cartridge 200 may store intrinsic information (i.e., identifying information) of the toner refill apparatus 400 connected at the time when an error has occurred during a toner refill.

Accordingly, the processor 130 may, when the availability of the toner refill apparatus 400 is identified, read identifying information stored in the toner cartridge 200 and identify the availability of the toner refill apparatus 400.

In an implementation, the toner cartridge 200 may further store information commonly stored in the toner cartridge 200 in addition to the information described above.

FIGS. 7 and 8 are diagrams illustrating an example of information stored in a toner cartridge and a memory of an image forming apparatus, in a case that an error has occurred and information of a toner refill apparatus is stored in the memory.

Referring to FIGS. 7 and 8, the toner cartridge 200 may store flag information indicating that an error has previously occurred. The memory 140 of the image forming apparatus 100 may store intrinsic information (e.g., identifying information) of the toner refill apparatus 400 connected at the time when an error has occurred during a toner refill.

Accordingly, when a refill of the toner cartridge 200 proceeds, the processor 130 may identify whether an error has occurred on the basis of the flag information stored in the toner cartridge 200, and identify whether it is possible to perform a toner refill by means of the toner refill apparatus 400 by comparing the stored intrinsic information with intrinsic information of the toner cartridge 200.

Figure 9:
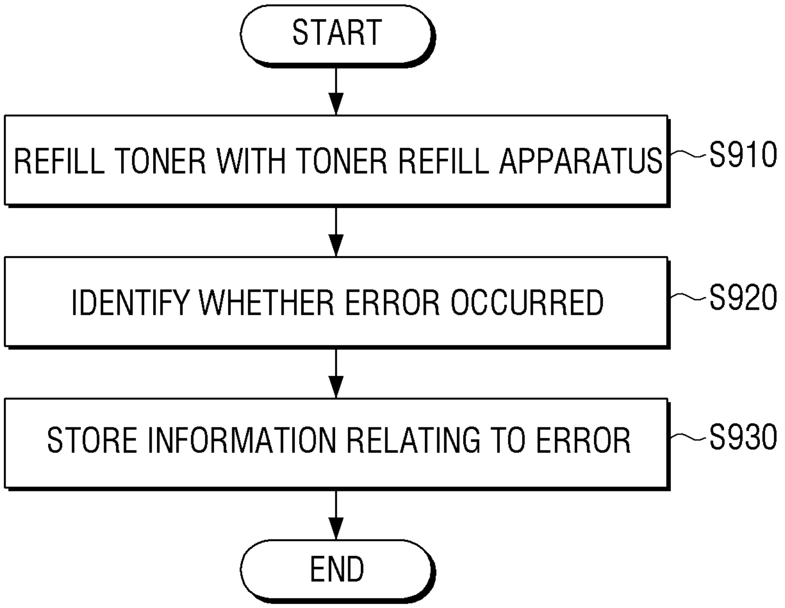
FIG. 9 is a flowchart illustrating a method for error handling, according to an example.

FIG. 9 is a flowchart illustrating a method for error handling, according to an example.

Referring to FIG. 9, a toner refill of a toner cartridge is performed using a toner refill apparatus, at operation S910. As part of the toner refill process, the toner refill apparatus may be fixed to an image forming apparatus.

It may be identified whether an error has occurred in the toner refill apparatus as described above, at operation S920. For example, an occurrence of an error may be input through a button provided on the main body of the image forming apparatus. Alternatively, when a toner refill is not completed within a predetermined time, it may be identified that the error has occurred.

When it is identified that the error has occurred in the toner refill process, information relating to the error may be stored in the toner cartridge, at operation S930. A fixing of the toner refill apparatus and the image forming apparatus may be released.

When a toner injection is completed without an occurrence of an error, information indicating that the toner refill apparatus is used may be stored in a memory chip of the toner refill apparatus, and the fixing of the toner refill apparatus and the image forming apparatus may be released.

In accordance with the error handling method, the fact that the error has occurred is stored in the toner cartridge when the error has occurred, and thereby it is possible to restrict a refill operation of a new toner refill apparatus for a toner cartridge in which the error has occurred before.

The communication method in the image forming apparatus described above may be implemented as a program and provided to an image forming apparatus. As an example, the program including a communication method in an image forming apparatus may be stored in a non-transitory computer readable medium and provided therein. The non-transitory computer readable medium refers to a medium that stores data semi-permanently rather than storing data for a very short time, such as a register, a cache, a memory, etc., and is readable by an apparatus.

The foregoing examples and advantages are not to be construed as limiting the present disclosure. The present teaching can be readily applied to other types of apparatuses. Also, the description of the examples of the present disclosure is intended to be illustrative, and not to limit the scope of the claims, and many alternatives, modifications, and variations will be apparent to those skilled in the art.

What is claimed is:

1. A toner cartridge comprising:

a customer replaceable unit monitoring (CRUM) apparatus to store error information of a toner injection process of the toner cartridge using a toner refill apparatus, wherein, based on the error information not being stored in the CRUM apparatus, an availability of a refill operation of the toner cartridge is identified based on a predetermined first reference value and an amount of toner identified in the toner cartridge, and wherein, based on the error information being stored in the CRUM apparatus, the availability of the refill operation of the toner cartridge is identified based on a predetermined second reference value and the amount of toner identified in the toner cartridge.

2. The toner cartridge of claim 1, wherein the error information is at least one of flag information indicating that an error occurred in the toner injection process or identifying information of the toner refill apparatus.

3. The toner cartridge of claim 1, wherein the CRUM apparatus is to store identifying information of the toner refill apparatus.

4. The toner cartridge of claim 3, wherein, based on the error information being stored in the CRUM apparatus, the availability of the refill operation of the toner cartridge is further identified based on the identifying information of the toner refill apparatus stored in the CRUM apparatus.

5. The toner cartridge of claim 1, further comprising a sensor to detect the amount of toner in the toner cartridge.

6. The toner cartridge of claim 1, wherein the predetermined first reference value is greater than the predetermined second reference value.

7. The toner cartridge of claim 1, wherein the CRUM apparatus is at least one of attached to the toner cartridge or mounted in an image forming apparatus in which the toner cartridge is located.

8. The toner cartridge of claim 1, wherein the CRUM apparatus includes at least one of a memory, a memory chip, a chip apparatus, or a toner cartridge memory.

9. The toner cartridge of claim 1, wherein the CRUM apparatus is to store information for authenticating the toner cartridge.

10. The toner cartridge of claim 1, wherein the CRUM apparatus is to store information indicating the amount of toner identified in the toner cartridge.

11. The toner cartridge of claim 1, further comprising a terminal for electrical connection to the toner refill apparatus.

12. A toner cartridge comprising:

a memory to store an amount of toner identified in the toner cartridge and error information of a toner injection process, wherein, based on the error information not being stored in the memory, the availability of the toner refill operation for the toner cartridge is identified based on a predetermined first reference value and the amount of toner identified in the toner cartridge, and wherein, based on the error information being stored in the memory, the availability of the toner refill operation for the toner cartridge is identified based on a predetermined second reference value and the amount of toner identified in the toner cartridge.

13. The toner cartridge of claim 12, wherein the error information is at least one of flag information indicating that an error occurred in the toner injection process or identifying information of a toner refill apparatus used during the toner injection process.

14. The toner cartridge of claim 12, wherein the memory is to store information of a toner refill apparatus used during the toner injection process.

15. The toner cartridge of claim 14, wherein, based on the error information being stored in the memory, the availability of the toner refill operation for the toner cartridge is further identified based on the information of the toner refill apparatus used during the toner injection process stored in the memory.

* * * * *